Patented Nov. 25, 1952

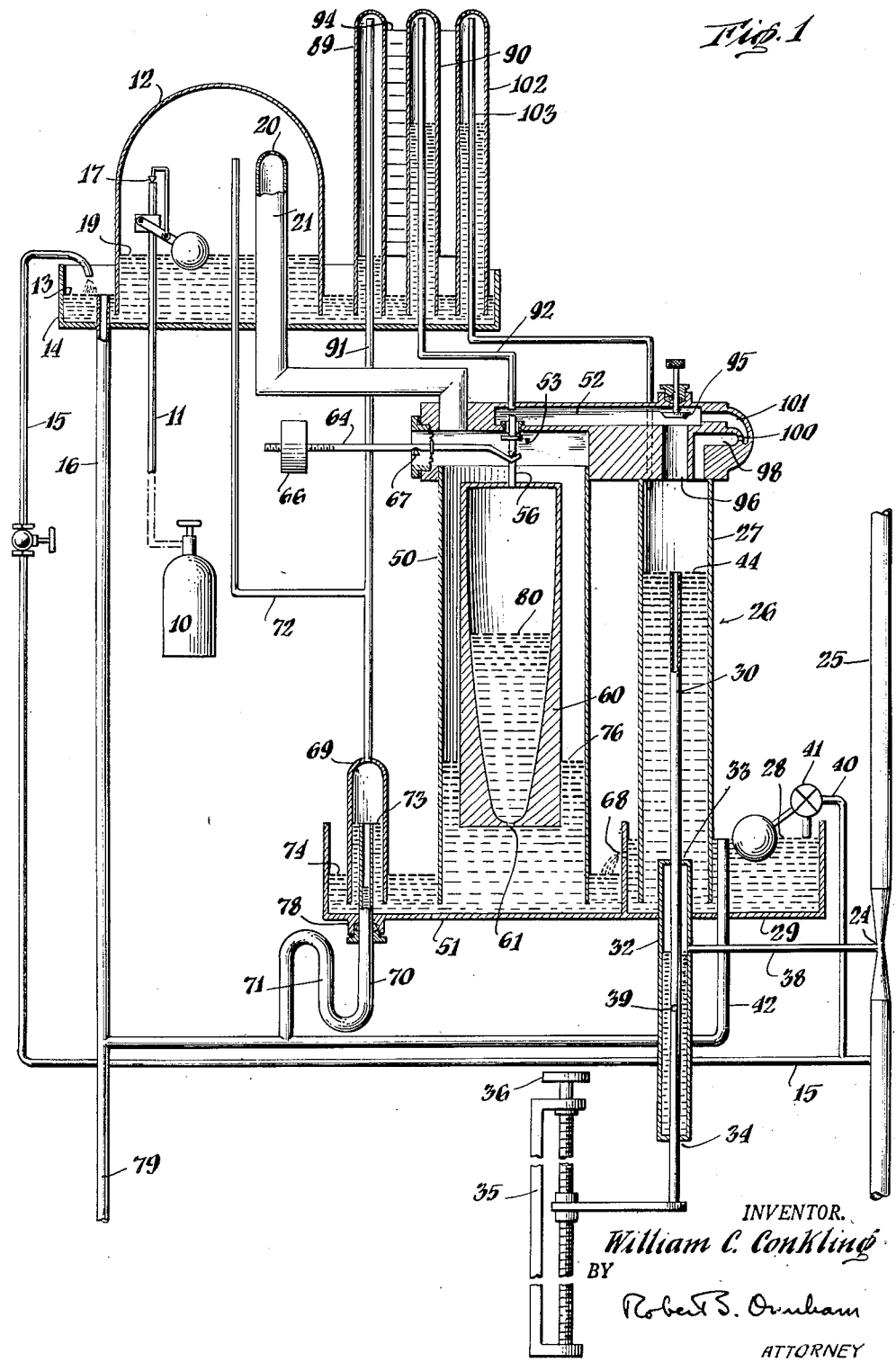

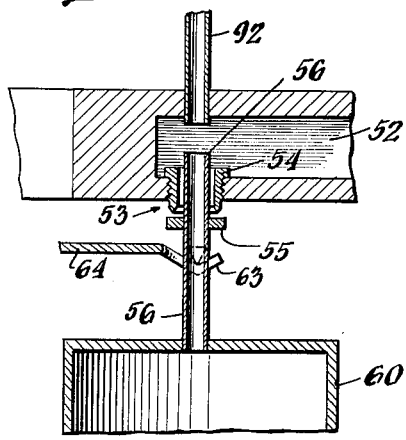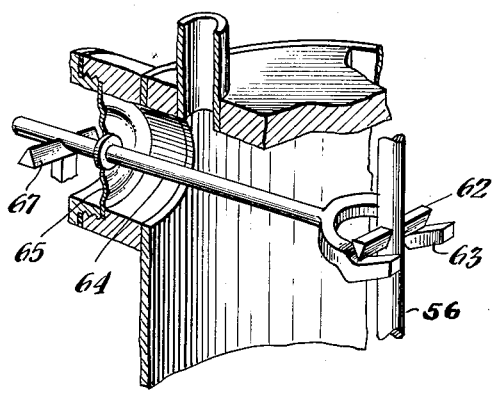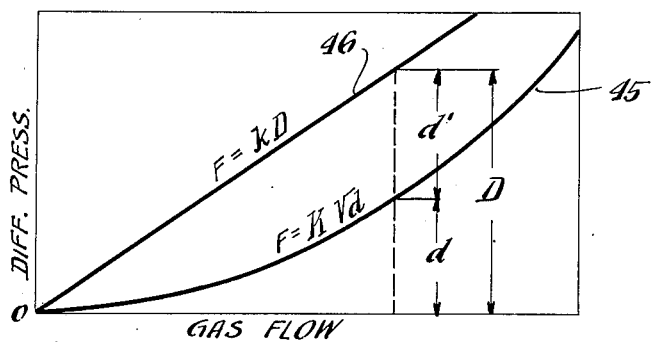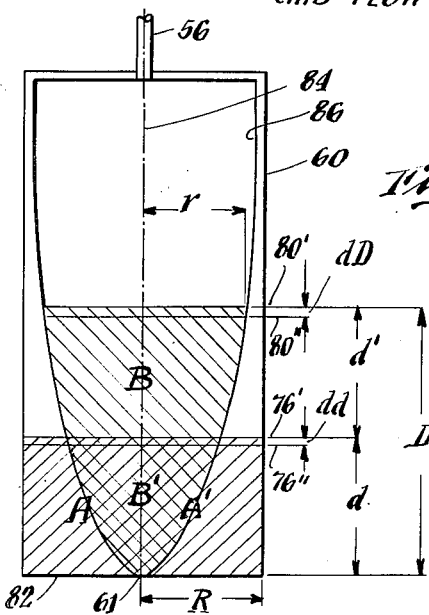

2,619,114

UNITED STATES PATENT OFFICE 2,619,114

GAS FLOW CONTROL APPARATUS

William C. Conkling, West Caldwell, N. J., assignor to Wallace & Tiernan Co. Inc., Belleville, N. J., a corporation of New York Application February 7, 1947, Serial No. 727,153

17 Claims. (Cl. 137—501)

1

In apparatus for advancing gas, for example in devices adapted to feed a reagent gas to a point of use, a convenient flow-controlling arrangement heretofore employed has included a fixed resistance in the conduit structure for gas flow, and means for adjusting pressure conditions in the conduit so that the rate of flow past the resistance will change in a known manner with the pressure changes.

For instance, in one form of apparatus whereby the contents of a water main or the like are treated with a gas, such as chlorine, for purification, by first incorporating the gas in a minor stream of water leading to the main, the control means for the rate of actual gas feed to the minor stream has included a fixed orifice (sometimes called a metering orifice) with adjustable means for maintaining a constant pressure drop across the orifice, i. e. constant at any selected magnitude within the range of adjustment. An effective arrangement is to feed the gas under a vacuum or "negative pressure" established by an aspirator, thus serving as the gas injector, in the conduit for the minor flow of water. On the upstream side of the fixed orifice in the gas conduit from the source of gas to the aspirator, means are provided for maintaining a predetermined constant pressure, e. g. a small vaccum. Constant pressure means are also provided in the conduit between the orifice and the injector, to maintain a selected lower pressure (a higher vacuum), the last mentioned means being adjustable for change of the pressure drop and thus of the rate of gas flow as explained above. The pressure throughout the conduit can be maintained in the negative or subatmospheric range, by the vacuum induced in the aspirator, although sometimes supplemental vacuum-establishing means may be used, particularly in combination with instrumentalities for automatic control of pressure conditions.

While apparatus of the character described is of great utility and provides an essentially accurate and readily regulated control of gas feed, it has a limited range under many circumstances because of the characteristic of flow through an orifice. Gas flow past such a resistance is generally proportional to the square root of the pressure difference across it, and in consequence the flow at a large pressure difference is not proportionately high in relation to the flow at small differences. That is to say, as the pressure drop increases the rate of flow increase becomes smaller and smaller. As a result, within a useful range of negative pressures, the range of flow variation is limited.

Stated in another way: if exact regulation of flow by reasonably substantial increments is desired for the higher values, great difficulty is encountered in obtaining like accuracy of regula-

2 tion at small amounts of flow, since at the lower rates a small change of pressure drop then produces an inordinately large change of flow. On the other hand, if the apparatus is designed to provide very gradual change of pressure relations at the lower end of the desired scale, mechanical limitations tend to limit severely the extension of the same control equipment to higher values of gas flow, since the mechanical adjustments for making reasonably useful pressure changes at the lower end of the scale will then, at the higher end, only yield flow changes so small that the apparatus can not practically reach any relatively large rate of gas feed. Finally, another disadvantage of the described arrangements is that a scale graduated in flow units, for the pressure control means or for a pressure-responsive flow indicator, is awkward in appearance and use because of the non-linear relationship between flow and pressure adjustment.

Accordingly a primary object of the present invention is to provide apparatus for advancing a gas wherein the foregoing disadvantages are reduced or overcome, and particularly to provide apparatus wherein the rate of flow of the gas may be controlled more accurately at comparatively low rates of flow. A further object is to provide means of the character described in which the flow-determining pressure differences are controlled by instrumentalities that afford the maintenance of very constant and readily adjustable pressures, especially negative pressures, throughout all portions of a desired range; and another object is to provide such apparatus wherein a desired relationship between actual gas flow and the controlling pressure difference may be established, i. e. a relationship different from that ordinarily characterizing flow through a fixed orifice, for better control of gas flow, and also if desired, to afford a more convenient type of scale or indication for registering the magnitude of flow.

Another and more specific object is to provide improved gas feed apparatus wherein the rate of flow may be linearly or approximately linearly proportional to the pressure difference which is adjusted to change the flow, so that a wider range of flow variation is obtainable and likewise a better control at low rates of flow, while at the same time a linear indicating scale is readily permitted for reading the actual value of flow at any time.

Additional objects include the provision of improved and novel means responsive to pressure conditions in a conduit for gas flow, to establish a resistance in the conduit having a value variable in accordance with a predetermined relation to the pressure conditions, and the provision of novel instrumentalities responsive to the value of pressure drop at spaced localities along a flow of gas, for producing a mechanical displacement or force capable of use to adjust the flow in accordance with a predetermined function of the pressure difference.

For the accomplishment of the foregoing and other objects, including such as are incidental to the use of the disclosed apparatus, a presently preferred embodiment of the invention is hereinbelow described and shown in the accompanying drawings, by way of example and as an illustration of the underlying principles.

In the drawings:

Figure 1 is a largely diagrammatic view, with various parts in vertical section, of apparatus embodying the invention;

Fig. 2 is an enlarged fragmentary vertical section of an adjustable orifice embodied in Fig. 1;

Fig. 3 is a fragmentary perspective view of part of the balancing structure for the orifice adjusting means;

Fig. 4 is a set of mathematical curves illustrating flow relationships in the device; and Fig. 5 is a diagrammatic illustration, as if in vertical section, of a pressure-responsive orifice adjusting device, to show certain mathematical characteristics thereof.

Referring to Fig. 1, the apparatus is shown as comprising a system for feeding gas, such as chlorine, from a source of supply to a locality of use, for instance a flow of water into which the gas is introduced for solution; but it will be understood that the illustrated means or equivalent structures embodying the principles of the invention and of various elements and subcombinations thereof, may be applied under a variety of circumstances and for different purposes in various kinds of gas handling equipment.

In the system shown, the gas is drawn from a supply tank 10 through a conduit 11 and into a chamber provided by a bell jar 12 which is suspended with its lower edge below the surface 13 of water in a tray 14, it being understood that the lower edge of the bell jar is supported, by means not shown, so as to provide clearance above the bottom of the tray for free communication of water, similar means being understood (without further mention) to be provided for various other tubes and chambers hereinafter described as fixedly suspended over like water-sealing arrangements. The water level 13 in the tray is kept constant, under continuous water supply through an input line 15, by a level-determining overflow pipe 16. Within the bell jar 12 the conduit 11 opens through a float-operated pressure-reducing valve 17, which may be of a design known for devices of this character and functions to keep the actual gas pressure in the chamber 12 at a constant sub-atmospheric value, represented by the correspondingly constant level 19 of the water in the chamber, above the outside level 13 in the tray. From the bell jar chamber, gas is withdrawn through a fixed, calibrated orifice 20 at the upper end of an outlet tube 21, such structure being sometimes described as a metering orifice and metering tube in a so-called vacuum chlorinator.

Through means presently to be described, the conduit for gas flow extends from the tube 21 to an aspirator or injector device 24 in a water conduit 25, the gas being drawn into the water in the conduit (where it is to be dissolved) by the vacuum or negative pressure developed in the aspirator.

A pressure-adjusting device, generally designated 26 is provided intermediate the orifice 20 and the aspirator 24 so that the negative pressure on the aspirator side of the orifice may be set at any selected value, i. e. at a higher vacuum or lower pressure than within the bell chamber 12, to determine the rate of gas flow through the orifice. In the illustrated example, the device 26 comprises a cylindrical chamber 27 having its lower end opening below the level 28 of water in a tray 29, and its upper end communicating with the conduit 21 from the bell jar. An outlet tube 30 extends upwardly into the chamber 27 from below the tray 29, and at a lower part is enclosed by a supplemental tubular chamber 32, which has at its upper and lower ends suitable sliding seals 33, 34 engaging the outer surface of the tube 30. Thus the latter may be moved up or down, with respect to chambers 32 and 27, by appropriate adjusting means such as a lead screw device 35 and having an operating knob 36. From a side wall of the chamber 32, conveniently below the tray 29, a conduit 38 extends to the aspirator 24. The movable pipe or tube 30 is open at its upper end within the chamber 27 and also has a side port 39, conveniently disposed so that it will be within the tubular chamber 32 throughout the desired range of adjustment of the device. Water may be continuously supplied to the tray 29 through an inlet pipe 40 and a float-controlled inlet valve 41 so as to keep the level 28 constant, as determined by an overflow pipe 42.

With the described instrumentalities the value of the vacuum or negative pressure in the chamber 27 is effectively determined by the height of the upper end of the tube 30 above the water level 28 in the tray. For example if the vacuum tends to increase in the chamber 27, the resulting rise of its water level 44 to a point above the upper end of the tube 30, is at once prevented by overflow of the water through the tube 30 and thence through the port 39 to the pipe 25. In other words, any tendency toward excess negative pressure in the chamber 27, over the selected value, is relieved by the described overflow. At the same time, gas flows from the chamber down through the pipe 30, for delivery through the conduit 38 to the aspirator 24. During normal operation the lower chamber 32 is filled with water to a level approximating the entrance of the pipe 38; that is, there is actually a continuous overflow of water from the chamber 27 through the pipe 30 along with the gas, because the range is preferably such that even at maximum the vacuum in the chamber 27 is less than that established by the aspirator. Adjustment of the vertical position of the tube 30 adjusts the negative pressure maintained in the chamber 27; moving the tube down reduces the vacuum (i. e. increases pressure), and vice versa.

The instrumentalities so far described, without further means shown in the conduit between the orifice 20 and the chamber 27, would constitute a flow control apparatus of the conventional orifice type, of which further or other details may be found by reference to United States Patents 1,514,939 and 1,777,986, to Charles F. Wallace. As explained, such system comprises a fixed orifice and means for maintaining an adjustable pressure difference across it, so that the actual gas flow is determined by the maintained drop, but with disadvantages such as mentioned hereinabove, particularly due to the fact that the flow is proportional to the square root of the drop.

Referring now to Fig. 4, which is a graph of gas flow plotted against pressure difference, the curve 45 may be taken as characteristic of flow under control of the instrumentalities just described, the mathematical equation being, in its simplest terms, $$F = K\sqrt{d} \quad (I)$$

where F is flow, $d$ is the pressure drop across the orifice, and K is a suitable constant. Thus for changes of flow at low rates, the required changes of pressure drop may be extremely small, causing difficulty in control or a limitation of range as explained above.

In accordance with the present invention, instrumentalities are included to afford a different relation between gas flow and the controlling pressure conditions, e. g. means providing an automatically adjustable pressure drop in the path of flow. Although other relationships may be obtained, as will become apparent from the disclosed principles of the invention, the illustrated embodiment is designed to provide a linear or substantially linear relation between flow and pressure difference, as affording a simple and workable arrangement for control and indicating purposes. A linear response is indicated in Fig. 4 by the line 46, representing the equation $$F = kD \quad (II)$$

where D represents the controlling pressure difference and $k$ is a suitable constant. Pursuant to my discovery, a relation such as indicated by the line 46 may be achieved with an adjustable flow resisting device which automatically increases the pressure drop, so to speak, in varying degree with change of gas flow, so as to convert the pressure differences $d$ to values represented by D. As shown in Fig. 4, this purpose is served by the addition of a further pressure drop $d'$; and the means described below therefore provides in the gas flow line a resistance exhibiting such drop $d'$ and automatically varying as required in response to changes of the total drop D, and conveniently in direct response to changes of negative pressure in the chamber 27.

Referring now again to Figs. 1, 2 and 3, the conduit 21 opens into the top of a relatively large vertical chamber 50 which has its lower edge sealed by water in a tray 51 comprising a partitioned extension of the tray 29. Communication between the chamber 50 and a further conduit 52 leading to the top of the chamber 27 is afforded through an adjustable orifice or throttle valve generally designated 53 and comprising a cylindrical sleeve or bushing 54 in the top wall of the chamber 50 and a valve disk 55 adapted to be disposed in close proximity to the lower edge of the sleeve 54. The valve disk 55 is mounted on a tube 56 which is free to move vertically as hereinbelow explained, so that the opening between the disk 55 and the lower end of the sleeve is adjusted in area in accordance with the vertical position of the tube, i. e. being changed through a relatively wide range by very small vertical movements of the latter. The tube 56 at its lower end opens into the top of an elongated cylindrical bell chamber 60, and also conveniently serves as the support by which this chamber is suspended.

The lower end of the chamber 60 has a small central opening 61 and the inner and outer walls of the chamber have respective configurations contributing to the automatic establishment of pressure-responsive controlling forces to provide the desired gas flow relationship as explained below. In the example shown, the outer surface of the bell 60 is a simple cylinder about a vertical axis, while the inner wall has a parabolic configuration, i. e. tapering from a wide radius at the top of the chamber toward the center or axis at the bottom in a parabolic curve, so that the interior of the chamber comprises a surface defined by rotation of an upwardly opening parabola abouts its axis.

To support the chamber, the tube 56 carries a pair of knife edges 62 seated on a fork 63 at the end of a balance arm 64 which extends in sealed relation through a highly flexible wall member 65, such as thin rubber or the like, and which carries at a remote end an adjustable counterweight 66, the arm 64 being appropriately seated on a knife edge 67 between its ends. As explained in more detail below, the weight 66 is designed and adjusted to balance the weight of the bell chamber 60, with its associated tube 56.

The tray 51 is conveniently supplied with water at a constant rate, for example by flow from a port 68 in the adjacent wall of the tray 29, i. e. in the partition between the tray structures. Since the water in the tray 29 is kept at a constant level 28, higher than the level in the tray 51, by mean including provision for continuous addition of water, the rate of flow through the port 68 will be governed solely by the constant head above it and therefore will have a constant value. Another chamber 69 is inverted over the water in the tray portion 51, having its lower edges sealed therein but spaced from the bottom of the tray. An overflow tube 70 extends upwardly into the chamber 69 from below the tray 51 and the upper part of the chamber 69 communicates with the interior of the bell jar 12 by a static tube connection 72. The overflow pipe 70 leads to waste through a suitable trap 71 which prevents communication of the outside atmosphere (through the waste pipe) with the interior of the chamber 69.

It will now be seen that since the level 73 of water in the chamber 69 will be kept constant at the upper end of the pipe 70 by continuous overflow of the water continuously supplied to the tray 51, the level 74 of the water in the tray will occupy a position spaced below the level in the chamber 69 by a distance corresponding to the vacuum in the bell jar 12, i. e. the difference between these levels being therefore equal to the difference between the levels 19 and 13. At the same time the level to which water rises in the chamber 50, i. e. outside the suspended bell 60, is governed by the vacuum in the conduit 21, on the downstream side of the orifice 20, so that the difference between the level 76 in the chamber 50 and the level 74 in the tray 51 is representative of the absolute negative pressure in the passage 21. Furthermore, when the gas flow approaches zero the pressure in the conduit 21 must be approaching that in the bell jar 12, so that the level 76 then approaches the level 73 of the water in the chamber 69. Since it is desirable for the specific mathematical design here shown, as will become more apparent below, to have the level of water in the chamber 50 for zero flow coincide with the lower end of the suspended bell 60, adjustment to provide such condition may be conveniently made by sliding the overflow pipe 70 up or down relative to the tray 51. To permit such adjustment the pipe 70 may traverse the bottom of the tray through a suitable sliding seal 78.

For convenience of connection, the overflow pipes 16, 42 and 70 may discharge through a common waste pipe 79, and the water supply conduit 40 may comprise a branch of the similar conduit 15, in turn connected for supply from the pipe 25.

Through the small opening 61 at the lower end of the suspended bell 60, water is free to rise in the latter, to a level depending upon the negative pressure in the passage 52, which under normal conditions communicates freely with the upper end of the chamber 27. That is to say, the tube 56 passes through the valve sleeve 54, opening above the latter in the conduit 52, so that the pressure in the bell 60 is that of the downstream side of the adjustable orifice 53. Thus the level 80 of water in the bell 60 has a height above the water level 74 which measures the vacuum in the bell and the conduit 52, and during normal operation is likewise equal to the difference between the levels 44 and 28 of the pressure-adjusting device 26.

The instrumentalities described, particularly including the bell 60, provide means for automatic adjustment of the orifice 53 in response to changes of pressure drop between the bell jar 12 and the control chamber 27, more specifically in response to changes of pressure in the chamber 27, so as to provide the desired over-all characteristic of the response of flow to pressure changes. Except at times of zero flow, when the valve 53 tends to close in the presently preferred form of the apparatus or in accordance with a presently preferred mode of operation, there is a pressure drop across the orifice 53 such that the gas pressure outside the bell 60 is greater than that inside. Considering these pressures as applied to the top of the bell 60, the resulting force tends to move the device downwardly, and analysis of the various pressures acting on the bell reveals that this downward force is equal to the weight of the water drawn up within it, i. e. the paraboloid volume of water between the opening 61 and its level 80. However, in a position of equilibrium of the structure the downward force is in effect balanced by the buoyancy of the bell and its contents, in the surrounding water, such buoyancy being equal to the weight of the volume of water displaced by the exterior of the device, i. e. below the level 76 in the chamber 50.

For consideration of the forces upon it, the bell structure itself is effectively weightless, i. e. in that its dry weight is assumed to be exactly balanced by the counterweight 66 so that the structural parts exert no effective gravitational force. In passing, it may therefore be noted that the material or nature of construction of the bell can be considerably varied in this form of the device, the element being made of metal, plastic or other substance, and of a solid or hollow walled structure, depending on the circumstances of design, a light-weight material such as aluminum, hard rubber or other plastic being preferable for ease of balance and minimization of friction effects.

As intimated above, with a given pressure difference between the bell chamber 12 and the control chamber 27, an equilibrium condition of the bell 60 is reached (for a corresponding flow of gas) in which the weight of the water drawn up into the bell equals the weight of water externally displaced by the portion of the bell that extends below the level 76 in the chamber 50. Suppose now that the pressure in the conduit 52 is reduced, i. e. the vacuum is increased in the chamber 27 by raising the tube 30. As a result the level 80 of the water in the bell rises, and likewise a force is exerted tending to move the bell downwardly.

If a substantial downward movement of the bell were allowed to occur, its greater displacement of water in the chamber 50 would represent an increased buoyancy, and thus an opposing force which would eventually arrest the bell. Even a very slight downward movement of the bell, however, is effective to produce a significant change in the opening of the valve 53, by lowering the disk 55 to a slight extent. The immediate result of this enlargement of the orifice 53 is to reduce the pressure drop across it, specifically by relieving or reducing the pressure on the entering side of the orifice, so that the vacuum in the chamber 50 increases.

In consequence the water level 76 in the chamber 50 rises, thereby rapidly and substantially increasing the upward force on the bell 60 due to buoyancy. The opening movement of the orifice and the corresponding rise of the water in the chamber 50 proceed to a new condition of equilibrium, where the increased buoyancy due to the greater displacement of water by the bell 60 exactly balances the increased downward force due to the greater quantity of water drawn up within the bell. With equilibrium reestablished, the orifice remains in its adjusted position, it being understood that there has been little actual vertical displacement of the bell and also that the achieved equilibrium among the control factors, viz. the amount of opening of the orifice, the pressure inside the bell and the value of pressure drop across the orifice (which governs the difference between levels in chambers 50 and 60), has automatically taken into account, in the manner needed for the desired flow relationship, the effect on such drop of the increased rate of gas flow.

If, on the other hand, the vacuum in chamber 27 is decreased, i. e. by moving the tube 30 downward, the pressure within the bell 60 is correspondingly raised and the water level 80 is lowered. Under such conditions the bell exerts less downward force and tends to be raised by the buoyancy determined by the existing level 76 in the chamber 50. Although the bell chamber might conceivably rise a substantial distance until the buoyancy is reduced to a balancing value, its initial, slight upward movement produces a significant displacement of the valve disk 55 to a more closed position of the valve 53. The area of this orifice being thus reduced, pressure rapidly builds up in the chamber 50, depressing the water level 76 and thereby reducing the upward force on the bell 60 due to buoyancy. As in the case of the opposite adjustment described above, the closing movement of the orifice 53 and the corresponding fall of the water level in the chamber 50 proceed to a new condition of equilibrium, where the forces on the bell are again exactly balanced and where the orifice will remain in its adjusted position. Likewise as before, there is little actual movement of the bell in a vertical direction, and the achieved equilibrium takes account of the effect of the desired extent of gas flow change, upon the drop across the orifice.

Thus upon any change of pressure in the passage 52, the structure including the movably supported chamber 60 responds to exert a force in one vertical direction or the other, and rebalance of the bell, overcoming such force, is provided by an adjustment of the orifice 53. While other constructions are possible, for example even wherein the orifice 53 is separately adjusted until an instrumentality registering such force has been caused to reassume a normal position, or wherein other automatic valve-controlling means are more remotely connected in a follow-up relation for control or actuation by the bell, the illustrated structure provides a direct and conveniently automatic adjustment of the orifice in response to an unbalance of forces on the bell. Furthermore, by reason of the adjustments of the orifice and the relative configurations of the inner and outer bell surfaces, the relation between pressure drop and flow across the orifice is made to follow the desired mathematical expression, e. g. in the present example so as to compensate for the characteristics of flow across the fixed orifice 20, in an algebraic manner providing an over-all response of flow to pressure difference that is strictly linear.

That is to say, since the two opposing forces respectively represented by the weight of water drawn up in the bell and the weight of water displaced externally are a function of the physical shape and dimensions of the bell chamber, it may be proportioned to effectuate any of a variety of relationships between pressure drop and gas flow. Specifically in the present arrangement, the equilibrium condition that governs the orifice opening provides a drop across the latter equal to $d'$, as shown in Fig. 4, so that for any given pressure difference D between the bell jar 12 and the chamber 27, the partial drop $d$ across the orifice 20 is supplemented by the appropriate amount $d'$ to bring about the linear response indicated by the line 46.

As indicated above, the actual adjustment of the orifice even for a large change of pressure in the conduit 52 requires only a very slight movement of the bell, in fact so slight as to be of inappreciable effect on the relation of the bell chamber 60 to the liquid levels 76 and 80. In other words, in the illustrated apparatus a departure from equilibrium conditions surrounding the bell 60 provides a force in one vertical direction or the other, which is employed to bring about a change of the orifice opening; but rebalance or reestablishment of equilibrium is preferably effected, not by any considerable displacement of the bell 60, but by the change of pressure conditions occasioned upon the adjustment of the orifice 53. An arrangement operating on such principles is of particular advantage in permitting a direct and very accurate control of the orifice, since the actual position of the orifice adjusting member does not depend mechanically, beyond initial calibration, upon any pressure-measured change of position of the bell chamber 60. Furthermore, and especially for the reason last mentioned, calculations for the design of the bell chamber are facilitated, in that the latter may be assumed to be stationary, in effect, through the range of operation.

By way of example the following illustrates one way in which the configuration of the bell chamber may be determined for the specific apparatus described above. Referring to the flow equations (I) and (II) for the lines 45 and 46 of Fig. 4, and bearing in mind that the flow through the orifice 20 is necessarily the same as the flow at other portions in the conduit or generally through the conduit, the term F is thus the same in both equations and they may be combined as follows:

$$K\sqrt{d}=kD$$

or $$d=K'D^2 \qquad \text{(III)}$$

in which $d$ may be differentiated with respect to D, i. e.

$$\frac{dd}{dD}=K''D \qquad \text{(IV)}$$

where $K''$ is a constant fully determined by $k$ and K.

Referring now to Fig. 5, the bell chamber 60 is diagrammatically indicated and the lines 76' and 80' represent the correspondingly numbered levels of water in the mechanical illustration of Fig. 1. It will be apparent that the cylindrical volume between the line or level 76' and the bottom plane 82 of the bell is a measure of the upward force or buoyancy, while the downwardly tapering volume between the surface 80' and an apex at the small opening 61 (which may be deemed of inappreciable size, for purposes of these computations, as likewise the upper opening through the tube 56) measures the downward force on the bell. For convenience, the first of these volumes is designated AA' and the second BB'. It will also be apparent that the vertical distance between the bottom of the bell 82 and the surface 76' is equal to $d$, which represents the pressure drop across the orifice 20, for instance as measured in inches of water. Similarly the vertical distance between levels 76' and 80' represents the pressure drop $d'$ across the orifice 53, while the total distance between surface 80' and the bottom of the bell represents the total pressure drop D.

Although other external configurations may be adopted for the bell under some circumstances, convenience of calculation and design is facilitated by assuming a simple cylindrical shape, i. e. a cylinder having its axis along the vertical line 84. It may be taken, then, that R is the radius of the external cylindrical surface and $r$ is the radius of the internal surface of the bell, which may also define a solid of revolution about the axis 84, the value $r$ being variable with vertical distance from, say, the point 61.

In order to arrive at a mathematical expression for $r$, consideration may be given to small increments of the volumes AA' and BB', for example increments defined respectively between the surfaces 76'' and 76' and between the surfaces 80'' and 80'. It will be seen that corresponding to these increments of volume, the respective increments of altitude in the direction of the axis 84 may be considered as differentials of the values of pressure drop, viz. $dd$ and $dD$. Likewise, in accordance with understood principles of mathematics, each of the small increments of volume may be considered as a cylinder, having a radius R or $r$ and an altitude $dd$ or $dD$ respectively, so that they may be represented by the following:

$$d(AA')=\pi R^2 dd \qquad \text{(V)}$$

and $$d(BB')=\pi r^2 dD \qquad \text{(VI)}$$

Equating them, $$\pi r^2 dD=\pi R^2 dd$$

or $$r^2=R^2\frac{dd}{dD} \qquad \text{(VII)}$$

The differential volumes can be thus equated because volume AA' must equal volume BB' at every position of equilibrium, in accordance with principles explained above and mathematically expressed in the equations (I) to (III) related to Fig. 4. In equation (VII) substitution may be made for the relation $dd/dD$ as derived in equation (IV), so that $$r^2 = R^2 K'' D$$

or $$r = R\sqrt{K''D} \qquad (VIII)$$

which defines the curve followed by the outer extremity of $r$ as $D$ is varied from zero to the desired limit, i. e. the top of the bell chamber. This is an equation for a parabola, which is consequently the curve that is rotated, in effect, about the axis 84 to constitute the internal surface 86 of the bell.

It will now be seen that by selecting suitable values and determining the necessary constants from known characteristics of orifices selected as appropriate for the desired range, the shape and size of the bell may be readily computed, e. g. to achieve the desired corrective effect for obtaining a linear response in the illustrated system.

For example, one method of such computation involves first selecting the range of gas flow desired and the range of total pressure differences expected to be available in a given apparatus. The value of $k$ is at once determinable from equation (II) above; for instance if the range of pressure differences obtainable, between the bell jar 12 and the chamber 27, is from zero to 10 inches of water, and the range of gas flow is to be from zero to 10 cubic feet per minute, the constant equals one (1). In the next place, a value of the constant $K$ may be selected so that with the above range of flow, there is a variation of $d$ in equation (I) from zero to a desired upper limit, conveniently substantially smaller than the above maximum value of $D$, for instance 45 per cent of the latter value. With the foregoing quantities ascertained (especially $K$), the size of the fixed orifice 20 can be computed, or determined by a convenient experimental procedure, as will now be understood by persons skilled in the art.

Since both of the constants $k$ and $K$ are known, the constant $K''$ for equation VIII is likewise known. In view of the upper limit selected for D (as expressed in inches of water), the height of the bell 60 can be readily chosen, say 25 to 50 per cent greater than such limit, so as to permit some operating leeway. Finally, a suitable value may be selected for R, the outside radius of the bell, and the shape of the inner surface can then be plotted from Equation VIII. If desired, the value of R can be chosen, e. g. by trial and error, for maximum convenience of manufacture in shaping the inner surface 86 to provide the desired figure with sufficient accuracy for true fidelity of response in subsequent operation.

In one instance where the original values were selected as noted above satisfactory dimensions were found to include an outside radius (R) of 3 inches, and a height of 10 inches, and with $K''$ equal to 0.09 the interior shape of the bell was determined by Equation VIII for values of D from zero to the total height.

The apparatus lends itself to convenient indication of the actual magnitude of gas flow at any time. For example the tray 14 may have an extended portion, as shown, where the lower ends of a pair of vertical, transparent tubes 89 and 90 (closed at the top) are sealed below the water surface 13. A static tube 91 extends up in the tube 89 nearly to the top and communicates with the pipe 72 to the interior of the bell jar 12, while another static tube 92 similarly disposed in the tube 90 communicates with the interior of the passage 52. Hence the pressures in the tubes 89 and 90 are respectively those on opposite sides of the orifice system 20—53, and the difference in levels of water drawn up into the tubes corresponds to the total pressure drop. Since in the described system the gas flow varies linearly with the total drop, a scale 94 can be provided between the tubes 89 and 90 to indicate the rate of flow by direct measurement of the difference of levels in linearly uniform graduations of flow units. In actual use the rate of flow is changed when desired by adjusting the device 26 with the knob 36, whereupon the described instrumentalities, including the means for automatic adjustment of the orifice 53, operate to change the resistance in the necessary correspondence with the change of pressure drop so that the flow varies in the predetermined manner (here a linear relation) different from the relation characteristic of a fixed orifice alone; and adjustment of the knob 36 is terminated when the desired new rate of flow is observed with the scale 94.

In the specific example shown the weight of the bell device 60, apart from the several forces of fluid pressure on it, is intended to be balanced exactly by the counterweight 66 at the outer end of the balance arm 64. By making the arm 64 of sufficient extent on each side of its fulcrum 67, for instance as shown the relatively minute vertical movements of the bell device and its tube 56 necessary for adjustment of the orifice 53, will have no appreciable effect on the state of balance of the bell by the counterweight. While in some cases (as for obtaining a characteristic of response other than the specific linear relationship disclosed, or indeed in a variety of cases by providing a different shape for one or both of the inner and outer bell surfaces) it may be desirable to have a predetermined unbalance of the bell, i. e. a constant, predetermined force upward or downward, it appears peculiarly advantageous, e. g. for convenience of design and accuracy of response, to have an exact balance so that the bell is in effect weightless. Likewise although other balancing means such as other types of weights, floating structure or the like may be used, the illustrated arrangement is at present preferred, especially for ease of initial adjustment.

While it is possible in some circumstances to obtain a useful approximation of balance when the equipment is inoperative and dry of water, for instance by adjusting the counterweight 66 until the valve disk 55 just touches or just fails to touch the lower edge of the tube 54, much greater accuracy of response will be obtained, particularly for low rates of flow by an adjustment made during actual operation. With the design shown, at a very small gas flow even a slight deficiency of balance, i. e. a slight excess weight of the bell, may open the orifice 53 unduly. That is to say, the total pressure drop is then very small and likewise the buoyancy afforded by the water in the chamber 50, so that if the bell is not precisely balanced but has even a small force of gravity tending to pull it down, the size of the orifice opening will in effect be determined by the excess weight rather than by the desired equilibrium of forces due to pressure relations. Similarly, if there is an over-balance, so to speak, providing an upward force, the orifice will tend to remain closed at low rates of flow and until the vacuum in the conduit 52 sufficiently exceeds the vacuum in the conduit 21 to overcome the excess upward force. Referring to Fig. 4, the effect of an unbalance may be considered as distorting the shape of the line 46 from a true, straight line, particularly at regions near the origin, i. e. regions close to zero flow. Hence although the modification of response may be relatively small or even insignificant at higher rates of flow, inaccuracy of balance should be avoided for maximum realization of the benefits of the invention in the part of the range were they are needed most.

In further accordance with the invention, a convenient arrangement to permit accurate adjustment of the counterweight includes a valve 95 in the conduit 52, which may be moved down against an appropriate valve seat 96 so as to close the direct passage from the chamber 27 to the upper end of the tube 56. A supplemental connection comprising a conduit 98 opening through a very small orifice 100 into a by-pass enclosure 101 provides alternative communication between the chamber 27 and the conduit 52, around the valve 95. The orifice 100 is preferably made very small, specifically to have an area which is a small fraction of that of the orifice 20, so that if the valve 95 is closed and the apparatus is set in operation for feed of gas, which must then necessarily traverse the orifice 100, the major part of the total drop between the bell jar 12 and the chamber 27 occurs in the high resistance of the orifice 100. A further transparent tube 102 closed at its upper end and having its lower end sealed by the water in the tray 14 is provided alongside of the tubes 89 and 90, and a static tube 103 communicating with the chamber 27, extends up into the tube 102, so that the height of water in the latter represents the pressure in the controlled chamber.

If the valve 95 is closed so that the path of gas flow from the bell jar 12 through orifices 20 and 53 to the passage 52 must then traverse the fixed orifice 100 to reach the chamber 27, and if the bell 60 were appropriately balanced for its intended response to adjust the orifice 53, a corresponding definite value of pressure would be reached in the passage 52 for each selected value of pressure in the chamber 27. Since the flow expressed as a function of pressure drop $x$ across the orifice 100 is the same as the flow expressed as a function of the drop $D$ across orifices 20 and 53, those expressions may be equated. If the value of drop across the orifice 100 is then replaced by its equivalent, the difference between the total drop $X$ across all orifices 20, 53 and 100 and the drop $D$ across orifices 20 and 53, an expression may be found for $D$ in terms of $X$ and determinable constants. Hence for a selected value of $X$ the corresponding definite value of $D$ can be calculated, and if the bell is not in fact balanced, all that is necessary is to adjust the device 27 until the difference in levels of the tubes 89 and 102 equals the selected value of $X$, and then to adjust the weight 66 until the pressure between the bell jar 12 and the passage 52 as indicated by the tubes 89 and 90 is equal to the calculated value of $D$. By hypothesis, the bell 60 is then exactly balanced by the counterweight, and no further change of the position of the latter will be needed for the desired normal operation of the apparatus throughout its range thereafter, i. e. with the valve 95 opened.

More specifically, the mathematical derivation of the equation for $D$ when the orifice 100 is connected in series for setting the counterweight, is as follows:

For any gas flow $F'$, $$F' = c\sqrt{x} = kD$$

But $$x = X - D$$

Substituting and transposing, $$D^2 + \frac{c^2 D}{k^2} = \frac{c^2 X}{k^2} \tag{IX}$$

The value of the constant $c$ may be determined by careful measurement of the orifice area and then by appropriate computation, or it may be found more accurately in some cases, by test. In any event, a method is afforded of computing the proper value of drop $D$ across orifices 20 and 53 for a selected flow, e. g. as represented by a selected magnitude of total drop when the valve 95 is closed to effect inclusion of the orifice 100 in the path of flow. As stated, balancing adjustment of the counterweight can thus be made when gas is flowing, merely by turning the weight until $D$ is indicated to have the magnitude that has been computed to correspond to the selected value of $X$, the total drop having been actually set at the latter value by the device 26. When such adjustment is made in the apparatus shown, the dead weight, so to speak, of the bell device 60 is balanced, and the setting of the orifice 53 then automatically bears the desired relation to pressure conditions in the conduit, under control of the bell device. Consequently the valve 95 may be opened, and the apparatus will thereafter operate in its intended manner, supplying gas to the injector 24 in linear proportion to the controlling pressure difference as determined by adjustment of the device 27.

Although alternative expedients can be used for setting the counterweight while gas is flowing, as by including a further manometer (not shown) to indicate the pressure in the passage 21 and then adjusting to obtain a drop across the orifice 20 equal to a value calculated to be proper for a given setting of the total drop across orifices 20 and 53, the arrangement described above is of notable advantage, in that it so readily permits the setting to be made with a very small flow of gas and without requiring a reading of pressure difference smaller than the total appearing across both orifices 20 and 53 for the stated small flow. It is especially desirable to make the orifice 100 very small relative to the orifice 20, i. e. so that the majority of the total resistance to flow will occur at the former; the desired low rate of flow is then had with a relatively large drop between the bell jar and the control device 26, so that any possible error in maintaining the selected drop $X$ is reduced to insignificance in the relatively small drop $D$ that must be read between the tubes 89 and 90 when the counterweight is being set. As explained above, small departures from balance of the bell 60 are particularly deleterious at low rates of flow, and since it is usually of most importance, and indeed an object of the invention, to provide an accurate control in the lower range, the described manner of adjusting the counterweight while gas is actually flowing at a very small rate, is extremely useful. In fact, it will now be seen that by selecting a suitably small size for the orifice 100, the adjustment can be made at the smallest gas flow for which it is anticipated that the apparatus will be used.

Once the weight is adjusted, the valve 95 is opened and left open; and the apparatus may be operated to feed gas, such as chlorine, from the source 10 to the point of use, i. e. the aspirator 24. The rate of flow is determined by the adjustable setting of vacuum in the device 26, and the instrumentalities comprising the bell 60 and the variable resistance 53 operate automatically in the manner explained above to provide the desired relationship between the actual flow and the controlling pressure conditions, in the present example, in cooperation with the fixed resistance 20, to impose a corrective, additional drop varying so that the flow is a linear function of the total pressure difference and thus of the setting of the device 26. As a result, the difficulty of trying to regulate for small flows by maintaining an extremely small drop across a fixed orifice and attempting an accurate adjustment of minuscule changes in such drop (since they then represent proportionately substantial changes in flow), is effectively obviated; an unusually wide range of flow is obtainable, with ready accuracy of adjustment by reasonable increments over the entire range; and the simple proportionality of flow to the differential vacuum provides a convenient and easily read scale for the manometer or such other pressure-responsive translating device as may be employed to register change in the magnitude of flow.

It is to be understood that the invention is not limited to the specific embodiments herein shown and described but may be carried out in other ways without departure from its spirit as defined by the following claims.

I claim:

1. In apparatus for advancing gas along a conduit, in combination, fixed and adjustable resistances in series in the order named along the path of gas flow in the conduit, means for adjusting the pressure in the conduit at a locality in said path beyond the resistances, to change the pressure drop between the upstream side of the fixed resistance and the said locality, for adjustment of the rate of gas flow, a vessel communicating with the conduit intermediate the resistances and having means for supplying liquid to said vessel to a level determined by the communicated pressure relative to the pressure upstream of the fixed resistance, a second vessel disposed within the first to extend into the liquid therein and to be subjected to force of buoyancy by said liquid and communicating with the conduit on the downstream side of the adjustable resistance, said second vessel having an opening at its lower end to admit liquid to a level determined by the communicated pressure, said second vessel being vertically movable relative to the other and having balancing means adjustable to effect a desired balance of the weight thereof so that the second vessel is free of response to said balanced weight, and means controlled by said movable vessel in response to said force of buoyancy and the force of pressure difference between the vessels, for adjusting the adjustable resistance, said inner vessel comprising a vertically varying wall structure modifying the said force of buoyancy on the inner vessel with change in pressure difference between the vessels in a predetermined non-linear manner, and said inner vessel being constructed and arranged relative to the outer vessel as to adjust the adjustable resistance, in response to said non-linear variation of force of buoyancy, for modifying the pressure drop across the fixed resistance in accordance with changes in the total pressure difference across both resistances so as to produce flow rates through the fixed resistance which follow a substantially straight line when plotted against total pressure difference across both resistances.

2. The apparatus of claim 1, which includes a supplemental calibrated resistance, means shiftable to interpose said resistance in the path of gas flow from the adjustable resistance to the aforesaid locality of pressure adjustment, and pressure indicating means for the conduit, whereby upon setting the pressure drop to a given value across all these resistances by the pressure adjusting means, the desired balance of the movable vessel may be obtained by adjusting the balancing means until the pressure drop across the first mentioned fixed and adjustable resistances equals a value that can be calculated, from the known calibration of the supplemental resistance and from the aforesaid predetermined relationship, as being produced when the movable vessel is operating to position the adjustable resistance for maintenance of said predetermined relationship.

3. In apparatus for advancing gas along a conduit, in combination, fixed and adjustable orifices in series in the order named along the path of gas flow in the conduit, means for adjusting the pressure in the conduit at a locality in said path beyond the orifices, to change the total pressure drop between the upstream side of the fixed orifice, and the said locality, for adjustment of the rate of gas flow, a vessel communicating with the conduit intermediate the orifices and having means for supplying liquid to said vessel to a level determined by the communicated pressure relative to the pressure in the conduit upstream of the fixed orifice, and a second vessel having structure vertically movably suspending it within the first vessel to extend into the liquid therein and to be subjected to force of buoyancy by said liquid and communicating with the conduit on the other side of the adjustable orifice, said second vessel having an opening at its lower end to admit liquid to a level determined by the communicated pressure, said structure having a counterweight adjustable to eject a desired balance of the weight of the second vessel so that said second vessel is subjected essentially only to forces other than its weight, said second vessel having a vertical wall increasing in thickness in a predetermined manner from the top toward the bottom for modifying the said force of buoyancy on the second vessel with change of pressure difference between the vessels in a predetermined non-linear relationship, said second vessel having means for adjusting the adjustable orifice and being normally in equilibrium by opposition of said force of buoyancy and the force of pressure difference between the vessels, for maintaining said orifice in a selected condition of adjustment, said orifice being adjustable by small displacements of said second vessel insufficient to move the latter from a position of balance of its weight, and said second vessel being constructed and arranged so as to adjust the adjustable orifice, upon departure of said second vessel from said equilibrium and in response to said non-linear relationship of the force of buoyancy, for modifying the pressure drop across the fixed orifice in accordance with changes in the aforesaid total pressure drop so as to produce flow rates through the fixed orifice which follow a substantially straight line when plotted against total pressure drop.

17

4. The apparatus of claim 3 wherein the wall of the second vessel has an outer cylindrical surface about a vertical axis and an inner surface defined by an upwardly opening parabolic curve rotated about said axis.

5. The apparatus of claim 3, which includes a valve for closing the conduit intermediate the adjustable orifice and the aforesaid locality of pressure adjustment, a by-pass conduit around said valve, including an orifice having a resistance substantially higher than the first mentioned fixed orifice, and means for separately indicating the pressure drop across the first mentioned orifice and the adjustable orifice and the pressure drop across all three orifices, to permit adjustment of the counterweight, when said valve is closed, to a predetermined adjustment represented by a calculable relation of the two last-mentioned pressure drops.

6. The apparatus of claim 3, wherein the means for supplying liquid to the first vessel comprises a liquid-containing vessel into which the first vessel extends, means supplying liquid continuously to the third vessel, an overflow pipe in the third vessel, and chamber means enclosing the overflow pipe and communicating with the conduit on the upstream side of the fixed orifice, whereby the level of liquid in the third vessel is maintained at a distance from its level in the chamber means equal to the difference between atmospheric pressure and the pressure on the upstream side of the fixed orifice, and whereby the level in the first vessel approaches that in the chamber means as the rate of flow approaches zero, said overflow pipe being adjustable to adjust the zero-flow position of the level in the first vessel.

7. In apparatus for advancing gas, in combination, a conduit for gas flow, flow-resisting means therein comprising a fixed resistance and an adjustable resistance in series in the order named along the path of flow, said fixed resistance being characterized by a non-linear relation of variation of gas flow to variation of pressure drop across said fixed resistance over a selected range of rates of gas flow, means for changing the gas flow by adjustment of the total pressure difference across said flow-resisting means, including means for adjusting the pressure in the conduit on the downstream side of said flow-resisting means, and pressure-sensitive means connected with the conduit for controlling the adjustable resistance, said pressure-sensitive means being constructed and arranged to adjust the adjustable resistance for modifying the pressure drop across the fixed resistance in accordance with changes in the total pressure difference across the flow-resisting means so as to produce flow rates through the fixed resistance which over the aforesaid selected range follow a substantially straight line when plotted against values of total pressure difference across the flow-resistance means.

8. Apparatus as described in claim 7 which includes a vacuum device connected to the conduit at a locality downstream of said means for adjusting the pressure in the conduit on the downstream side of the flow-resisting means, to feed gas under subatmospheric pressure throughout said conduit from a region upstream of the fixed resistance, and means connected to the conduit at a locality between said region and the fixed resistance, for maintaining a constant subatmospheric pressure on the upstream side of the fixed resistance, said pressure-sensitive

18 means being connected to the conduit, and controlled by changes in pressure, on the downstream side of the adjustable resistance, for response to changes in the aforesaid total pressure difference.

9. In apparatus for advancing gas, in combination, a conduit for gas flow, flow-resisting means therein comprising two orifices in series along the path of flow, one of said orifices being fixed and being characterized by a non-linear relation of variation of gas flow to variation of pressure drop across said fixed orifice over a selected range of rates of gas flow, and the other of said orifices being adjustable, means communicating with the conduit outside of the flow-resisting means, for adjusting the total pressure difference across said flow-resisting means, to change the rate of gas flow, including means for maintaining said total pressure difference at each selected value of adjustment, and pressure-sensitive means communicating with the conduit adjacent the adjustable orifice and responsive to changes in the total pressure difference across the flow-resisting means, for controlling the adjustable orifice, said pressure-sensitive means being constructed and arranged to adjust the adjustable orifice for modifying the pressure drop across the fixed orifice in accordance with changes in the total pressure difference across the flow-resisting means so as to produce flow rates through the fixed orifice which over the aforesaid selected range follow a substantially straight line when plotted against values of total pressure difference across the flow-resisting means.

10. Apparatus as described in claim 9 in which the adjustable orifice is disposed downstream of the fixed orifice in the path of gas flow along the conduit, and in which the means for adjusting the total pressure difference comprises means for adjusting the pressure in the conduit at a locality downstream of the adjustable orifice and means for maintaining a constant pressure in the conduit on the upstream side of the fixed orifice, the pressure-sensitive means being controlled by changes in pressure at the aforesaid locality, for response to changes in said total pressure difference.

11. Apparatus as described in claim 10 which includes a vacuum device connected to the conduit downstream of said locality to feed gas under subatmospheric pressure throughout said conduit from a region upstream of the constant pressure means, said constant pressure means being adapted to maintain a constant subatmospheric pressure on the upstream side of the fixed orifice, and said pressure-sensitive means being in communication with the conduit both at the aforesaid locality and at a locality between the orifices, and including normally-balanced orifice-controlling means adapted to be unbalanced by change of the pressure at the first-mentioned locality relative to the pressure at the last-mentioned locality for adjusting the adjustable orifice to effect the aforesaid modification of pressure drop across the fixed orifice, said orifice-controlling means being constructed and arranged to be rebalanced by an adjusted relation of the respective pressures of said localities which represents a pressure drop across the adjustable orifice that when subtracted from the changed total pressure difference produced by change of pressure at the first-mentioned locality, leaves the modified pressure drop across the fixed orifice.

12. Apparatus as described in claim 9 in which the means for adjusting the total pressure difference comprises means for adjusting the pressure in the conduit at a locality on the other side of the adjustable orifice from the fixed orifice and means for maintaining a constant pressure in the conduit on the other side of the fixed orifice from the adjustable orifice, the pressure-sensitive means being controlled by changes in pressure at the aforesaid locality, for response to changes in said total pressure difference.

13. In apparatus for advancing gas, in combination, a conduit for gas flow having an adjustable resistance therein providing a pressure drop between localities on opposite sides of the resistance, a pair of vessels arranged one within the other and respectively communicating with said localities of the conduit, means including a pressure-controlled source of liquid, and communicating with each vessel at a lower part of each, for supplying liquid to a level in each vessel which is determined by the pressure communicated to such vessel from the associated locality of the conduit, relative to the controlled pressure of the liquid source, one of said vessels being vertically movable relative to the other and being connected to control the adjustable resistance, the inner vessel being adapted to extend into the liquid in the outer vessel, for exertion of force of buoyancy upon the inner vessel by the liquid in the outer vessel, said force being normally balanced in accordance with the difference of levels of liquid in the vessels, said inner vessel having a vertical wall thickness varying along the vertical dimension to modify said force of buoyancy, with change in said difference of levels, in a predetermined non-linear manner relative to such change, said vessels and the aforesaid wall of varying thickness of the inner vessel being mutually constructed and arranged to effect balance-restoring adjustment of the adjustable resistance upon unbalance of the aforesaid force of buoyancy by change of pressure on one side of the resistance, for modifying the pressure drop across the resistance in accordance with changes in pressure on said last-mentioned side of the resistance relative to the controlled pressure so as to produce pressure drops across the resistance which vary, relative to said last-mentioned changes in pressure, in a predetermined non-linear manner, that is governed by the aforesaid non-linear variation of the force of buoyancy with change in said difference of levels.

14. In apparatus for advancing gas, in combination, a conduit for gas flow having an adjustable resistance therein providing a pressure drop across the resistance, a pair of liquid-receiving vessels respectively communicating with the conduit upstream and downstream of the resistance, one of said vessels being vertically movably disposed within the other vessel and extending into the liquid therein for exertion of force of buoyancy on said inner vessel by liquid in the outer vessel, means for supplying liquid to each vessel to a level therein determined by the communicated conduit pressure relative to a controlled pressure, said levels thereby differing in accordance with the aforesaid pressure drop, means for adjusting the pressure in the conduit on one side of the resistance relative to said controlled pressure, said inner vessel having a vertical wall thickness varying along the vertical dimension to modify said force of buoyancy, with changes in said difference of levels, in a predetermined non-linear manner relative to such changes, said inner vessel being connected to control the adjustable resistance in response to said force of buoyancy and the liquid levels in the vessels, and being constructed and arranged, relative to the outer vessel, to adjust the adjustable resistance for modifying the pressure drop across said resistance in accordance with changes in pressure on the last-mentioned side of the resistance relative to said controlled pressure, so as to produce pressure drops across the resistance which vary, relative to said last-mentioned changes in pressure, in a predetermined non-linear manner that is governed by the aforesaid non-linear variation of the force of buoyancy with change in said difference of levels.

15. Apparatus as described in claim 14 wherein the inner vessel communicates with the downstream side of the resistance, the outer vessel communicates with the upstream side of the resistance and the pressure adjusting means comprises means for adjusting the pressure in the conduit on said downstream side of the resistance, said resistance comprising an orifice having an adjusting member connected to the inner vessel and movable toward and away from closed condition of the orifice respectively upon small upward and downward displacements of the inner vessel, for effecting the aforesaid adjustment of the resistance, said inner vessel having means for balancing its weight free of liquid and being adapted to effect said orifice-adjusting displacements while remaining in substantially the same position relative to the outer chamber and with its weight balanced by said balancing means.

16. In apparatus for advancing gas, in combination, a conduit for gas flow having an adjustable orifice therein providing a pressure drop across said orifice, a vessel communicating with the conduit upstream of the orifice, a second vessel vertically movably suspended within the first vessel and communicating with the conduit downstream of the orifice, means communicating with the outer vessel at a lower part thereof, for supplying liquid to said outer vessel to a level therein determined by the pressure upstream of the orifice relative to a controlled pressure, said inner vessel being adapted to project into the liquid in the outer vessel and having a small opening at a lower part for admitting liquid into said inner vessel to a level therein determined by the pressure downstream of the orifice relative to said controlled pressure, means for adjusting the pressure in the conduit downstream of the orifice relative to said controlled pressure, said inner vessel being disposed to be subjected to force of buoyancy thereon by the liquid in the outer vessel and normally maintaining a position of equilibrium effected by difference of pressures in said vessels opposing said force of buoyancy, said inner vessel having a vertical wall thickness varying along the vertical dimension to modify said force of buoyancy, with changes of difference in levels of liquid in the vessels occasioned by changes in said difference of pressures, in a non-linear manner relative to said changes in pressure difference, said inner vessel being connected to said adjustable orifice and responsive to unbalance between said pressure difference and said force of buoyancy occasioned by change of pressure downstream of the orifice relative to the controlled pressure, for adjusting said orifice to change its pressure drop for thereby modifying the liquid levels to restore said equilibrium, said inner vessel being adapted to effect such modifications of said pressure drop which vary with changes of pressure downstream of the orifice in a predetermined non-linear manner governed by the aforesaid non-linear variation of the force of buoyancy.

17. Apparatus as described in claim 16 wherein the inner vessel has a vertical wall having a cylindrical outer surface and an inner surface substantially comprising an upwardly concave paraboloid of revolution coaxial with said cylindrical surface, the wall thickness of the inner vessel thereby decreasing upwardly in accordwith the region defined outwardly by said cylindrical surface and inwardly by said paraboloid of revolution.

WILLIAM C. CONKLING.

REFERENCES CITED

The following references are of record in the file of this patent:

UNITED STATES PATENTS

| Number | Name | Date |
|---|---|---|
| 991,641 | Plantinga | May 9, 1911 |
| 1,958,262 | Boland | May 8, 1934 |
| 2,227,297 | Coy | Dec. 31, 1940 |